United States Patent
Dunn et al.

(10) Patent No.: US 12,282,787 B2
(45) Date of Patent: Apr. 22, 2025

(54) INTER-ENVIRONMENT USE OF JAVA VIRTUAL MACHINES FOR MULTIPLE ADDRESS MODES

(71) Applicant: BMC Software, Inc., Houston, TX (US)

(72) Inventors: Jeffrey L. Dunn, Riley Township, MI (US); Jerry Jordan, Riverview, MI (US); Yoshitomo Terakado, Novi, MI (US)

(73) Assignee: BMC Software, Inc., Houston, TX (US)

( * ) Notice: Subject to any disclaimer, the term of this patent is extended or adjusted under 35 U.S.C. 154(b) by 164 days.

(21) Appl. No.: 17/649,489

(22) Filed: Jan. 31, 2022

(65) Prior Publication Data

US 2023/0244513 A1    Aug. 3, 2023

(51) Int. Cl.
*G06F 9/455* (2018.01)

(52) U.S. Cl.
CPC ...... *G06F 9/45508* (2013.01); *G06F 9/45558* (2013.01); *G06F 2009/45562* (2013.01)

(58) Field of Classification Search
CPC ............ G06F 9/45508; G06F 9/45558; G06F 9/45562
See application file for complete search history.

(56) References Cited

U.S. PATENT DOCUMENTS

| | | | |
|---|---|---|---|
| 8,074,229 B2 * | 12/2011 | Brunswig | G06F 9/544 |
| | | | 719/312 |
| 8,782,638 B2 | 7/2014 | Falby et al. | |
| 11,055,454 B1 * | 7/2021 | Gasser | G06F 30/20 |
| 2018/0165136 A1 * | 6/2018 | Fera | G06F 9/547 |
| 2018/0293162 A1 * | 10/2018 | Tsai | G06F 3/068 |
| 2020/0192730 A1 * | 6/2020 | Li | G06F 9/547 |

FOREIGN PATENT DOCUMENTS

EP    3929728 A1 * 12/2021    ............... G06F 8/60

OTHER PUBLICATIONS

IBM, "Language Environment Concepts Guide, z/OS Version 2 Release 3," available online at <https://www-01.ibm.com/servers/resourcelink/svc00100.nsf/pages/zOSV2R3SA380687/$file/ceea800_v2r3.pdf>, 2018, 94 pages.

T. Lindholm et al.: "The Java® Virtual Machine Specification, Java SE 8 Edition," available online at <https://docs.oracle.com/javase/specs/jvms/se8/jvms8.pdf>, Feb. 13, 2015, 604 pages.

* cited by examiner

*Primary Examiner* — Ziaul A Chowdhury
(74) *Attorney, Agent, or Firm* — Brake Hughes Bellermann LLP

(57) ABSTRACT

Described techniques enable inter-environment communication between a first runtime environment and a second runtime environment of an operating system. A function requested by an application executing in the first runtime environment may require execution by a second application running in a virtual machine in the second runtime environment. An address mode (AMODE) of the virtual machine may be determined from among at least two AMODEs. The second runtime environment may be launched from the first runtime environment, and the virtual machine may be launched within the second runtime environment, using the AMODE. The function may then be executed using the second application.

18 Claims, 5 Drawing Sheets

INTER-ENVIRONMENT USE OF JAVA VIRTUAL MACHINES FOR MULTIPLE ADDRESS MODES

TECHNICAL FIELD

This description relates to communication between different runtime environments.

BACKGROUND

Computing techniques have evolved and developed continuously since the beginning of the computing era. In some cases, new software has been developed for use with existing hardware resources. In other cases, new hardware has been developed that enables software techniques that would not have been feasible with a preceding generation of hardware.

Such technology developments have occurred, and continue to occur, together with constraints imposed by many different types of pragmatic limitations, such as time, cost, risk, and convenience. For example, many businesses have developed, deployed, and used computing platforms that provide suitably fast and reliable services for themselves and for their customers. Even if new hardware and software are available to such businesses, or other entities, the businesses may be unable or unwilling to modify or replace existing systems.

Consequently, it may be difficult or impossible for existing computing resources to make use of newly available computing resources. As a result, users of the existing computing resources may fail to benefit from features and advantages of the newly available resources.

SUMMARY

A computer program product may be tangibly embodied on a non-transitory computer-readable storage medium and may include instructions that may be executed by at least one computing device. When executed, the instructions may be configured to cause the at least one computing device to determine a function requested by an application executing in a first runtime environment, the function requiring execution by a second application running in a virtual machine in a second runtime environment, and determine an address mode (AMODE) of the virtual machine from among at least two AMODEs. When executed, the instructions may be configured to cause the at least one computing device to launch the second runtime environment from the first runtime environment, using the AMODE, launch the virtual machine within the second runtime environment, using the AMODE, and execute the function using the second application.

According to other general aspects, a computer-implemented method may perform the instructions of the computer program product. According to other general aspects, a system, such as a mainframe system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below.

Other features will be apparent from the description and drawings, and from the claims.

DETAILED DESCRIPTION

Figure 1:
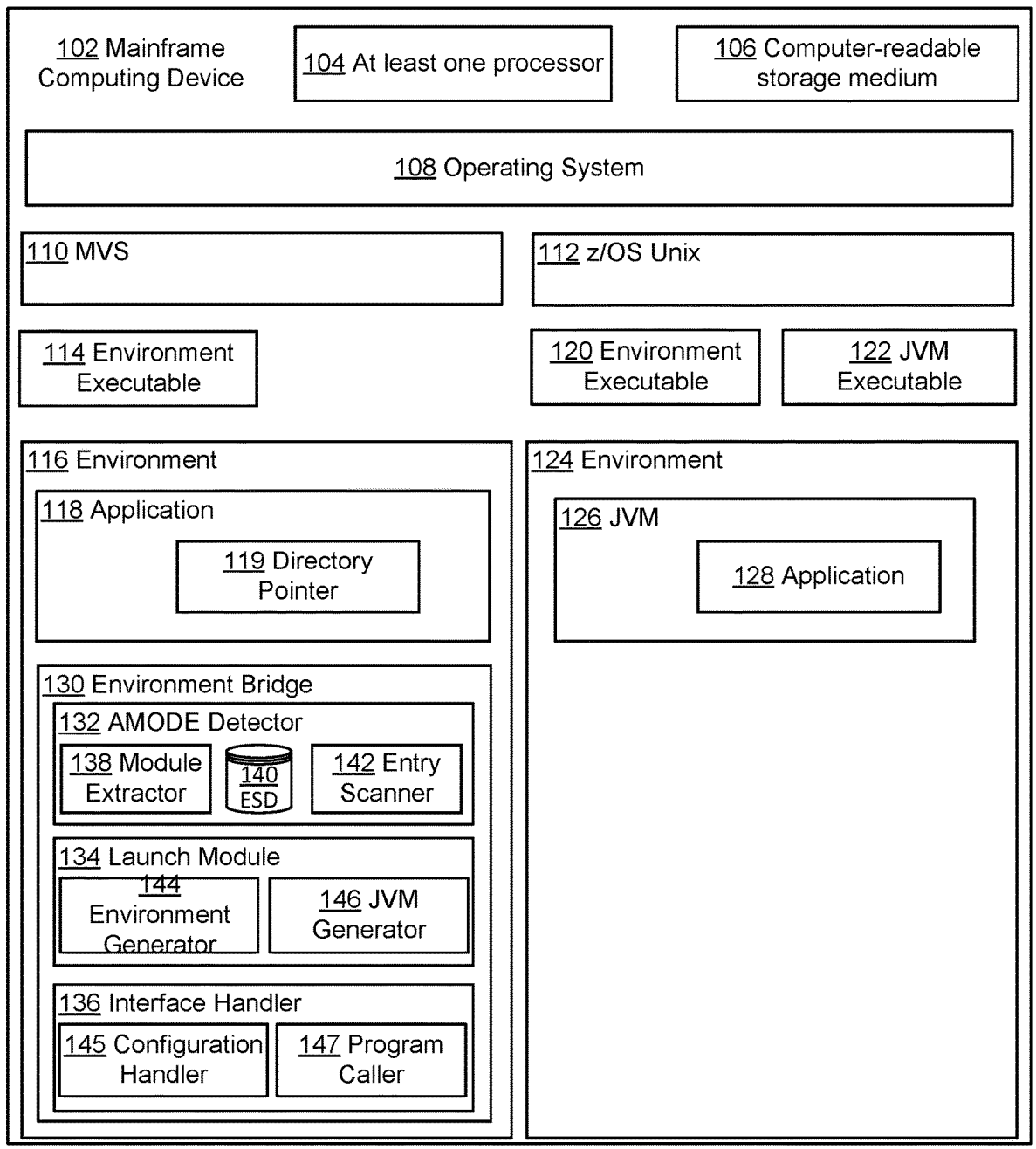
FIG. 1 is a block diagram of a system for inter-environment use of JAVA virtual machines (JVMs) for multiple address modes.

Described systems and techniques provide mainframe systems and techniques that enable continued use of existing mainframe resources, even as new mainframe resources are developed and used. For example, many businesses developed mainframe services using best-available mainframe resources at a time of development. Such mainframe services may be extremely valuable to the businesses using them. For example, such mainframe services may provide core functionalities in healthcare, banking, or industrial settings, may store and process vast amounts of data for millions of customers, and may have been in use for multiple decades. Such services may be referred to herein in some examples as legacy services, or legacy applications.

As new hardware and software resources have been developed, new mainframe services have also been developed to leverage advantages found in the new resources. For example, earlier generations of mainframe systems may use 24-bit or 32-bit addressing. More recent generations may use 64-bit addressing. Larger address spaces mean that more instructions may be processed and more data may be stored in each processing cycle, which means that, all else being equal, mainframe services may be provided faster and in greater volume. For example, larger address spaces make it easier to assign users desired amounts of virtual storage and related computing resources.

In some addressing schemes, one or more bits of an address may be reserved for some designated purpose and are not included or used for addressing. For example, a first bit or last bit of a 32-bit word may be used to facilitate compatibility with earlier addressing schemes, e.g., by designating information about how to use a remainder of the word. For example, a first bit being set to either 0 or 1 may indicate whether to use all remaining 31 bits of the word as an address, or to use only a lower 24 bits as an address (e.g., for compatibility with earlier 24-bit addressing schemes). Therefore, such systems may be referred to as using 31-bit addressing, even if 32-bit registers are used.

Many efforts have been made to ensure compatibility between systems and applications using different addressing schemes. The difficulty of doing so, however, is compounded by many other factors, including other factors related to optimizing performance of mainframe systems.

For example, in addition to managing the types of addressing schemes referenced above, an operating system (OS) of a mainframe system may implement one or more types of runtime environments for various programming languages. For example, programs written in various programming languages, such as C, C++, COBOL, Fortran, PL/I, and Java, may be compiled using language-specific compilers. Resulting, compiled programs may require different architectural constructs, interfaces, and libraries to perform the same or similar functions, which may be duplicative, incompatible, or otherwise problematic.

To avoid such difficulties, it is possible to provide a runtime environment that includes a common or compatible version of the types of runtime services just referenced. Such a runtime environment enables compiling and running programs written in any and all of the referenced languages (which may be referred to as high-level languages (HLLs)), as well as lower-level languages, such as assembly language programs, including Assembler language from IBM. While advantageous for these purposes, it may be difficult for the mainframe OS to manage and implement such runtime environments, while simultaneously maintaining compatibility between multiple addressing schemes.

For example, IBM provides a runtime environment known as Language Environment (LE). As just referenced, LE provides a common set of runtime libraries, and enables use of a single runtime environment for multiple applications, with little or no dependence on the programming language or system resources being used.

When using such runtime environments, a first runtime environment (e.g., applications running therein) may be partially incompatible with, and may be unable to access or otherwise utilize, desired features of a second runtime environment, within an overall computing environment. In a more particular example, described in detail below, a legacy application running in a first runtime environment may be unable, by itself, to call a JAVA virtual machine (JVM) running in a second runtime environment. For example, the first runtime environment may have a different address mode (AMODE) than the second runtime environment, such as when the first runtime environment has a 31-bit AMODE, and the second runtime environment may have a 64-bit AMODE.

Techniques described herein resolve the above difficulties by enabling a determination of an AMODE of a JVM to be executed in the second runtime environment, from within the first runtime environment. For example, described techniques enable a 31-bit legacy application in a first runtime environment to identify and use either a 31-bit JVM or a 64-bit JVM within the second runtime environment.

FIG. 1 is a block diagram of a system for inter-environment use of JAVA virtual machines (JVMs) for multiple address modes. In FIG. 1, a mainframe computing device 102, which may be referred to herein as a mainframe computer or mainframe, and refers to any other computer, or combination of computers in communication with one another, that is used to implement the types of mainframe applications referenced above, including the more specific examples provided below.

As is known, the mainframe 102 may be deployed by a business owner or organization, e.g., to support business functions. The mainframe 102 may support many different workstations or peripheral devices, or otherwise provide access and business functions to employees, administrators, customers, or other users.

The mainframe 102 is illustrated as including at least one processor 104 and non-transitory computer-readable storage medium 106. As the mainframe 102 supports business-critical functions for many (e.g., millions) of users, the at least one processor 104 may be understood to represent many different processors providing significant quantities of processing power. Similarly, the computer-readable storage medium 106 represents large quantities of various types of memory (e.g., registers, main memory, or bulk or secondary memory) that may be used to store instructions executable by the at least one processor 104, as well as to store data (e.g., business data, including customer data).

In addition to providing large quantities of processing and memory resources, the mainframe 102 should be understood to provide many other features and advantages, some of which are described herein by way of example. To assist in providing these features and advantages, an operating system (OS) 108 may be configured to, and optimized for, characteristics and functions of the mainframe 102. The OS 108 may, for example, provide task scheduling, application execution, and peripheral control. Put another way, the OS 108 enables use of the at least one processor 104 and the computer-readable storage medium 106 across many different use cases of the mainframe 102.

The OS 108 may represent or include a suite or collection of system tools and services designed to support operations of the mainframe computing device 102. In many cases, such tools and services may evolve over time, and new tools and services may be added as they are developed.

For example, the OS 108 may represent the z/OS® operating system, and may include, or utilize, a multiple virtual storage (MVS) system 110 and a z/OS Unix® system 112. The MVS system 110 represents an example of an older OS, or OS component included in, or used by, the OS 108, while the z/OS Unix system 112 represents an example of a more-recently developed OS component, which may be referred to as, or may include, a Unix System Services (USS) component.

Thus, the computing environment of FIG. 1 illustrates that the MVS system 110 and the z/OS Unix system 112 may be run on the same mainframe computer 102 and paired with one another to provide certain advantages, such as mutual file access. However, as described in detail below, there may be many ways in which the MVS system 110 and the z/OS Unix system 112 are not fully compatible with one another.

For example, the MVS system 110 may be designed to implement a 31-bit address space or AMODE, while the z/OS Unix system 112 may be designed to use either a 31-bit or 64-bit address space or AMODE. In more specific examples, the MVS system 110 may provide an environment executable 114 that may be used to instantiate, launch, and execute a 31-bit runtime environment 116 (e.g., language environment or LE), which may then be used to execute legacy applications represented by an application 118.

For example, the application 118 may refer to, and represent, the type of legacy mainframe service(s) referenced above. The application 118 may thus be written and compiled in the context of an earlier addressing scheme, such as the 31-bit addressing scheme referenced above. The application 118 may have been successfully compiled and deployed many years ago and may be providing its intended functions in a desirable and reliable manner.

It may be possible to re-write, re-compile, or otherwise update the application 118, e.g., to take advantage of an updated addressing scheme (e.g., 64-bit addressing) and other advancements in mainframe computing. However, such updates or other changes may incur extreme risk, expense, and inconvenience for an owner or operator of the mainframe 102.

For example, if the application 118 is supporting day-to-day operations of a business, including millions of customer transactions, deploying an updated version of the application 118 entails risks of malfunction of the updated version. Such malfunctions may have extremely negative consequences to the business, such as failed customer transactions and general customer dissatisfaction. Moreover, updating the application 118 may be extremely costly and time-consuming.

At the same time, the z/OS Unix system 112 provides features and advantages that are not natively available in the context of the MVS system 110. In particular, the z/OS Unix system 112 enables use of the Java programming language, which is a high-level, class-based, object-oriented programming language that cannot be executed directly in the MVS system 110.

The z/OS system 112 may execute using multiple AMODEs. For example, the z/OS Unix system 112 may provide an environment executable 120 that may be designed for one of two or more different AMODEs. For example, the environment executable 120 may be designed for a 31-bit AMODE or a 64-bit AMODE.

Further, in addition to providing use of Java, the z/OS Unix system 112 enables use of Java to provide Java Virtual Machines (JVMs). JVMs represent programs used to execute Java programs across many different machines and contexts, while providing uniform memory management.

There may be multiple versions or types of JVMs, including 31-bit JVMs and 64-bit JVMs. FIG. 1 illustrates a JVM executable 122, which may represent, e.g., either a 31-bit or a 64-bit JVM executable.

In operation, it is therefore possible to use the environment executable 120 to instantiate and launch a runtime environment 124 (e.g., language environment or LE). Then, a JVM 126 may be instantiated from the JVM executable 122. The instantiated JVM 126 may then be used to run a desired application 128. In examples described herein, the application 128 may be used by the application 118, e.g., to facilitate operations of the application 118 or to provide a function required by the application 118.

For example, in simplified and non-limiting examples described herein for purposes of explanation and illustration, the application 118 may process specific types of data (e.g., customer data), and the application 128 may provide specific encryption functions, which may be used to encrypt the data of the application 118 in a desired manner. Again, such examples are non-limiting, and are included merely to illustrate the point that the application 118 may require, or benefit from, functionality of the application 128.

In order to enable and facilitate such interactions, an environment bridge 130 may be configured to enable the application 118 to determine, inspect, and utilize the environment executable 120 and the JVM executables 122, notwithstanding differences (e.g., incompatibilities) between the MVS system 110 and the z/OS Unix system 112. As described in detail, below, the environment bridge 130 may include an AMODE detector 132 configured to determine a proper address mode to be used for the environment 124, the JVM 126, and the application 128. The environment bridge 130 may include a launch module 134 configured to launch the environment 124 and the JVM 126, using the determined proper address mode. The environment bridge 130 may also include an interface handler 136 configured to enable and facilitate interactions between the application 118 and the application 128, such as making calls or exchanging data.

In more detail, the AMODE detector 132 may be configured to utilize a user-defined path to the JVM executable 122. For example, when the application 118 is installed, it may be configured with a directory pointer 119 that points to a memory address or other location information (path) to the JVM executable 122, e.g., to a directory of the JVM executable 122.

Upon locating the JVM executable 122, a module extractor 138 of the AMODE detector 132 may be configured to extract modules from the JVM executable 122 that have been determined to be useful in discerning an AMODE of the JVM executable 122.

For example, the JVM executable 122 may be configured to provide the JVM 126 as either a 31-bit or 64-bit JVM, as already described. Nonetheless, the JVM executable 122 may include various files, program objects, classes, records, and other components or modules that may be one or more of 24-bit, 31-bit, or 64-bit. Therefore, the module extractor 138 may be configured to dismantle or disassemble the JVM executable 122 and extract only those modules contained therein that reliably indicate an actual address mode of the JVM 126 that will be needed.

In the example of FIG. 1, the module extractor 138 may be configured to identify and extract data from an external system directory (ESD) of the JVM executable 122, which may be stored in a prepared memory area shown as ESD 140 in FIG. 1. Then, an entry scanner 142 may scan individual entries (e.g., section records) of the ESD data 140 to find one or more indicators of an AMODE of the JVM executable 122. For example, a class object of retrieved code classes may be examined to determine the AMODE. More specific examples of operations of the AMODE detector 132 are provided below, e.g., with respect to FIGS. 4 and 5.

Once the proper AMODE of the JVM executable 122 is determined, the launch module 134 may proceed to launch or instantiate the environment 124 and the JVM 126. For example, an environment generator 144 may be configured to use the environment executable 120 to launch the environment 124.

For example, the z/OS Unix system 112 may potentially provide either or both of a 31-bit or 64-bit LE executable as an example of the environment executable 120, and the launch module 134 may be configured to select the correct LE executable based on the operations of the AMODE detector 132. In specific example implementations, the environment generator 144 may utilize LE pre-initialization (PIPI) services to initiate launching of the environment 124. For example, such PIPI services may load a PIPI program, set initial values, and call the PIPI program to create the environment 124 using the initial values. The environment generator 144 may be configured to choose, from a plurality of available PIPI services, a PIPI service (e.g., interface) that matches the determined AMODE of the JVM executable 122.

The environment generator 144 may also be configured to initiate a JVM generator 146, which may be configured to instantiate and configure the JVM 126, as well as define a path to the JVM 126 for use by the application 118, e.g., using the user-defined path used earlier by the AMODE detector 132. The JVM generator 146 may utilize a PIPI support module, including choosing a PIPI support module that matches the determined AMODE of the JVM executable 122. Further details regarding specific example operations of the environment generator 144 and the JVM generator 146 are provided below, e.g., with respect to FIG. 4.

Once the environment 124 and the JVM 126 have been launched, the interface handler 136 may be configured to use a configuration handler 145 to provide any further configuration required for the JVM to launch and implement the application 128 that was originally required by the application 118. The configuration handler 145 may be further configured to manipulate data passed by the application 118 to be formatted in a manner expected by the JVM 126.

Then, a program caller 147 may be configured to interface with the JVM 126 and the application 128, to call specific actions, values, or other functions on behalf of the application 118, and return results to the application 118. For example, the program caller 147 may invoke Java methods of the JVM 126, and, upon return from those methods, the configuration handler 145 may be configured to format the results for compatibility with the application 118.

In specific examples, a Java Native Interface (JNI) may be used by the interface handler 136. JNI is a programming framework that enables Java code running in a JVM to call and be called by applications written in other programming languages. More specific example uses of the JNI, and of the interface handler 136, are provided below, e.g., with respect to FIG. 4.

Figure 2:
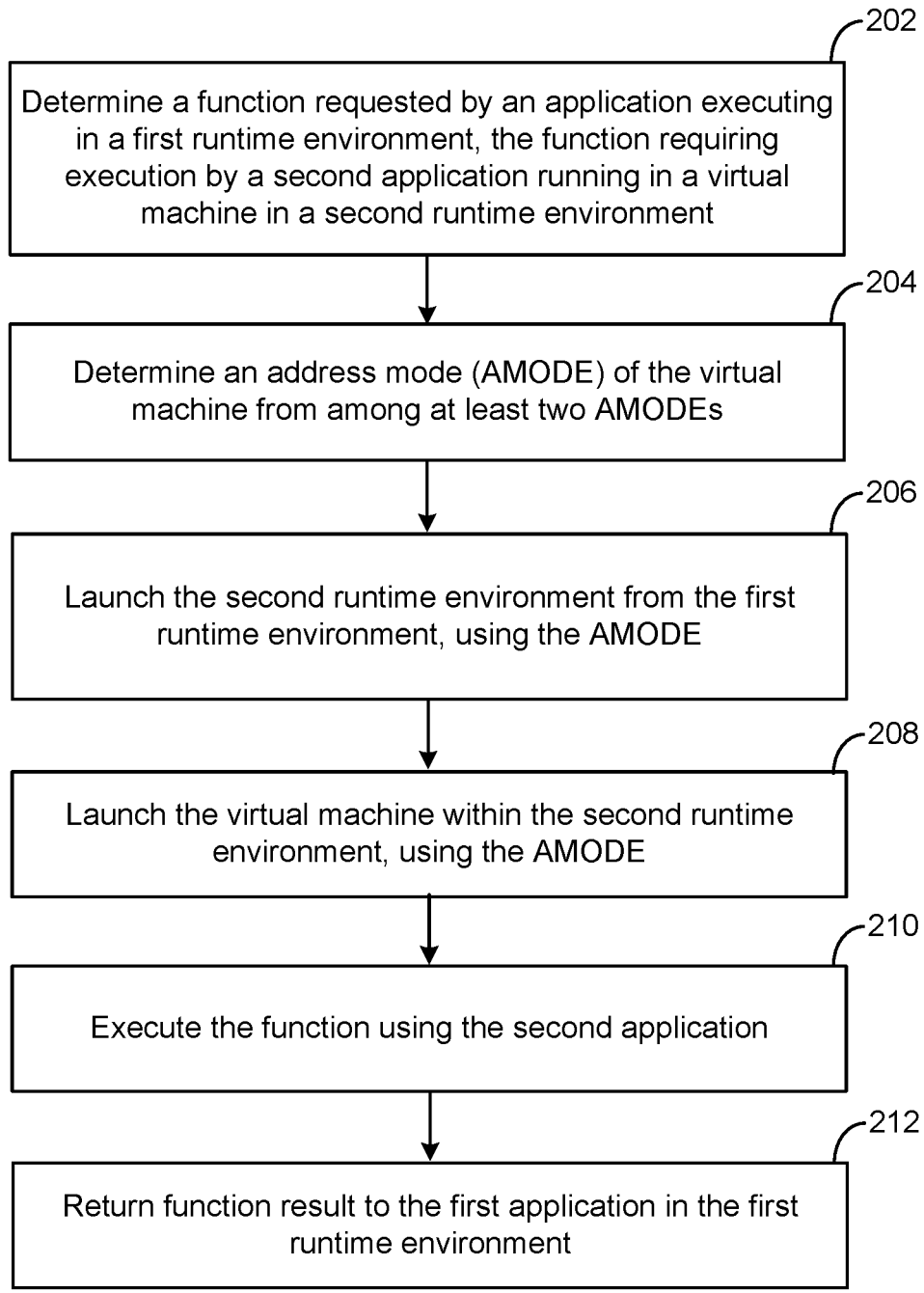
FIG. 2 is a flowchart illustrating example operations of the system of FIG. 1.

FIG. 2 is a flowchart illustrating example operations of the system of FIG. 1. In the example of FIG. 2, operations 202-212 are illustrated as separate, sequential operations. In various implementations, the operations 202-212 may include sub-operations, may be performed in a different order, may include alternative or additional operations, or may omit one or more operations. Further, in all such implementations, included operations may be performed in an iterative, looped, nested, or branched fashion.

In the example of FIG. 2, a function requested by an application executing in a first runtime environment may be determined, the function requiring execution by a second application running in a virtual machine in a second runtime environment (202). For example, the environment bridge 130 may be configured to determine that the application 118 requires an application or program function to be performed by the application 128 within the JVM 126.

An address mode (AMODE) of the virtual machine may be determined from among at least two AMODEs (204). For example, the AMODE detector 132 may be configured to inspect the JVM executable 122 to determine whether the JVM 126 should be either a 31-bit JVM or a 64-bit JVM.

The second runtime environment may be launched from the first runtime environment, using the AMODE (206). For example, the environment generator 144 of the launch module 134 may be configured to generate the environment 124. For example, when the environment 124 is an LE instance of the environment executable 120, the environment generator 144 may use LE PIPI services to generate the environment 124.

The virtual machine may be launched within the second runtime environment, using the AMODE (208). For example, the JVM generator 146 may be configured to generate the JVM 126 within the environment (e.g., LE) 124.

The function may be executed using the second application (210). For example, the application 128 may execute the requested function. For example, the interface handler 136, e.g., the configuration handler 145 may convert or format a call of the application 118 for the requested function, as needed. The program caller 147 may then use JNI to provide the call to the application 128 for execution of the requested function therewith.

A function result may be returned to the first application in the first runtime environment (212). For example, the JNI of the program caller 147 may receive the function result, for reformatting by the configuration handler 144 and forwarding to the application 118.

Figure 3:
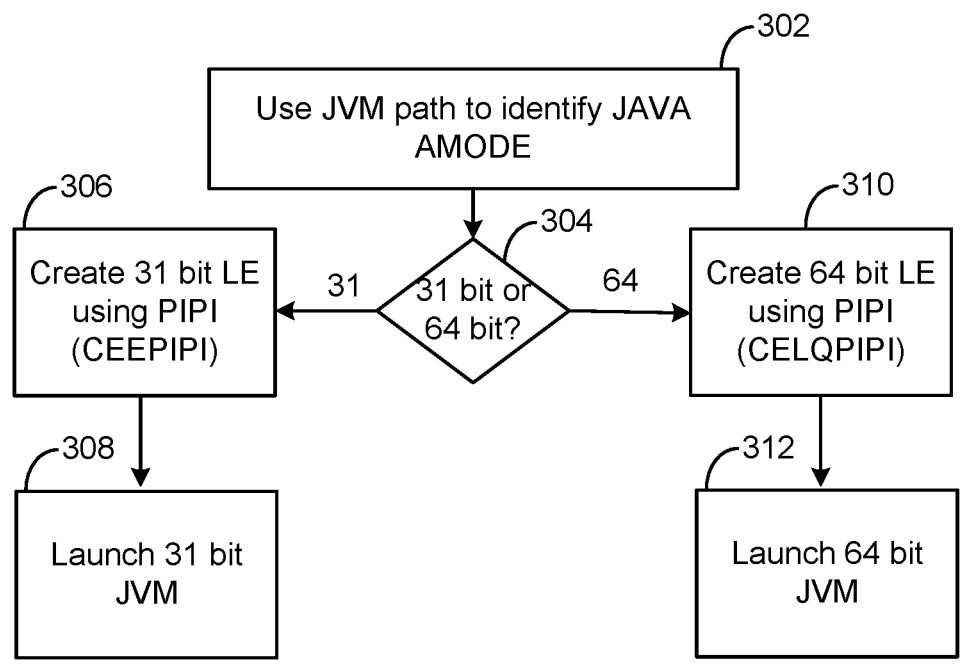
FIG. 3 is a flowchart illustrating a process flow according to the examples of FIGS. 1 and 2.

FIG. 3 is a flowchart illustrating a process flow according to the examples of FIGS. 1 and 2. FIG. 3 provides example implementations in which, with reference back to FIG. 1, the application 118 is written in Assembler in a 31-bit environment, and an installed JVM executable 122 may be in either a 31-bit or 64-bit environment.

Therefore, FIG. 3 illustrates example operations of the AMODE detector 132 of FIG. 1 in determining whether the JVM executable 122 uses a 31-bit or 64-bit AMODE. FIG. 3 further illustrates examples of the launch module 134 in generating and launching the environment 124 and the JVM 126. Thus, FIG. 3 illustrates example implementations in which 31-bit applications may create a JVM that utilizes the larger memory footprint of a 64-bit JVM, when available, without the need to modify the existing 31-bit application itself.

Specifically, in FIG. 3, a user-provided JVM path may be used by the AMODE detector 132 to identify the a Java AMODE (302). If the AMODE is 31-bit (304), then the environment generator 144 may be configured to create the environment 124 as a 31-bit LE (306). For example, the environment generator 144 may use or invoke PIPI services to create a 31-bit LE, such as the CEEPIPI invocation from IBM. Then, the JVM generator 146 may be configured to launch the JVM 126 as a 31-bit JVM (308).

If the AMODE is 64-bit (304), then the environment generator 144 may be configured to create the environment 124 as a 64-bit LE (310). For example, the environment generator 144 may use or invoke PIPI services to create a 64-bit LE, such as the CELQPIPI invocation from IBM. Then, the JVM generator 146 may be configured to launch the JVM 126 as a 64-bit JVM (312).

Figure 4:
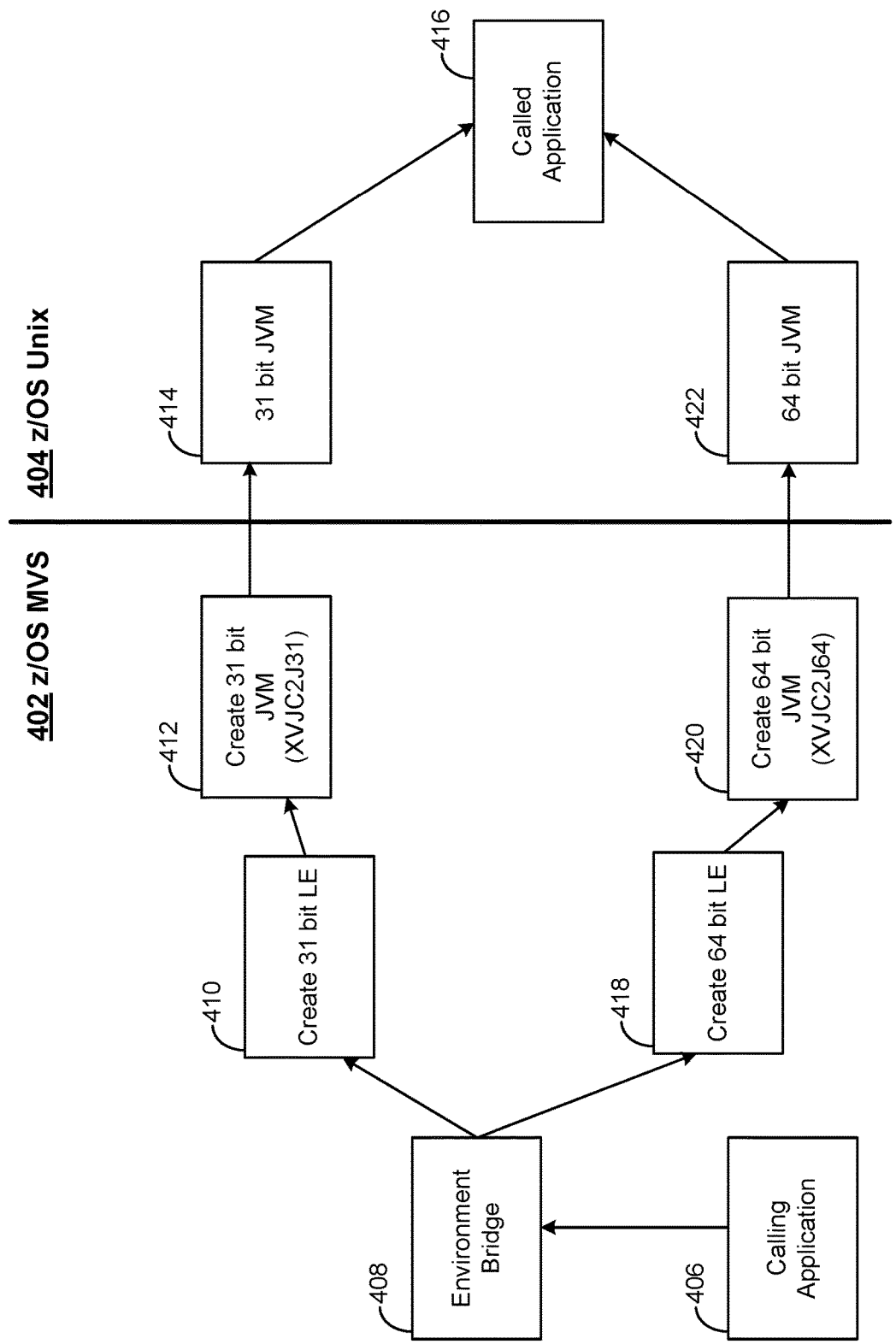
FIG. 4 is a flowchart illustrating a more detailed example of the examples of FIGS. 1-3.

FIG. 4 is a flowchart illustrating a more detailed example of the examples of FIGS. 1-3. FIG. 4 continues the example of FIG. 3 in more detail and illustrates a z/OS MVS environment 402 and a z/OS Unix environment 404. Within the z/OS MVS environment 402, a calling application 406 (corresponding to the application 118 of FIG. 1) may be a 31-bit Assembler program, and may utilize an environment bridge 408 as an instance or example of the environment bridge 130 of FIG. 1 to interact with the z/OS Unix environment 404.

For example, as just described with respect to FIG. 3, the environment bridge 408 may first determine whether the z/OS Unix environment 404 is a 31-bit or 64-bit environment. For example, the AMODE detector 132 may determine an AMODE of the java program within a user-provided JVM path.

FIG. 4 provides a more detailed example of operations of the AMODE detector 132, consistent with the examples of FIG. 1. For purposes of FIG. 4, the environment bridge 408 may be understood to use the module extractor 138 to extract, e.g., sections or classes that may contain information for the Java program. For example, a version of the Request Code type of call in the fast path binder utility IEWBFDAT from IBM may be called from an MVS side of z/OS and used to access and dismantle the various code sections of an LE program object on the Unix side of z/OS. Thus, the module extractor 138 may be configured to access and dismantle the JVM executable 122. For example, as referenced above and discussed in detail, below, ESD section records 140 may be extracted and stored, and ESD entries may be scanned by the entry scanner 142. Individual entries may be inspected for AMODE indicators included therein.

As described and illustrated above, e.g., with respect to FIG. 3, it is then possible to create a 31-bit LE (410) for a 31-bit AMODE, or to create a 64-bit LE (418) for a determined 64-bit AMODE. For example, CEEPIPI services may be used for the 31-bit AMODE, while CELQIPI services may be used for the 64-bit AMODE.

If a 31-bit LE is created for the environment 124 of FIG. 1, then a 31-bit JVM 414 may be created therein (412) as an example of the JVM 126. On the other hand, if a 64-bit LE is created for the environment 124 of FIG. 1, then a 64-bit JVM 422 may be created therein (420) as an example of the JVM 126. In either case, a called application 416 may be instantiated and run as an example of the application 128, so that the calling application 406 may obtain a desired function and any associated requested data.

For example, the JVM generator 146 may create (412) the 31-bit JVM 414 using an appropriate PIPI support module, such as the XVJC2J31 PIPI support module. Similarly, the JVM generator 146 may create (420) the 64-bit JVM 422 using an appropriate PIPI support module, such as the XVJC2J64 PIPI support module. The JVM generator 146 may be implemented in a program written using a high-level language and invoked by the underlying PIPI service(s).

In either case, appropriate JNI calls may be used to actually interface between the z/OS MVS environment 402 and the z/OS Unix environment 404, implemented by the interface handler 136 in conjunction with appropriate formatting conversions. Once the requested function is completed, the instantiated JVM (e.g., either 414 or 422) may be shut down, followed by shutdown of the corresponding LE in which the shut down JVM was running.

Figure 5:
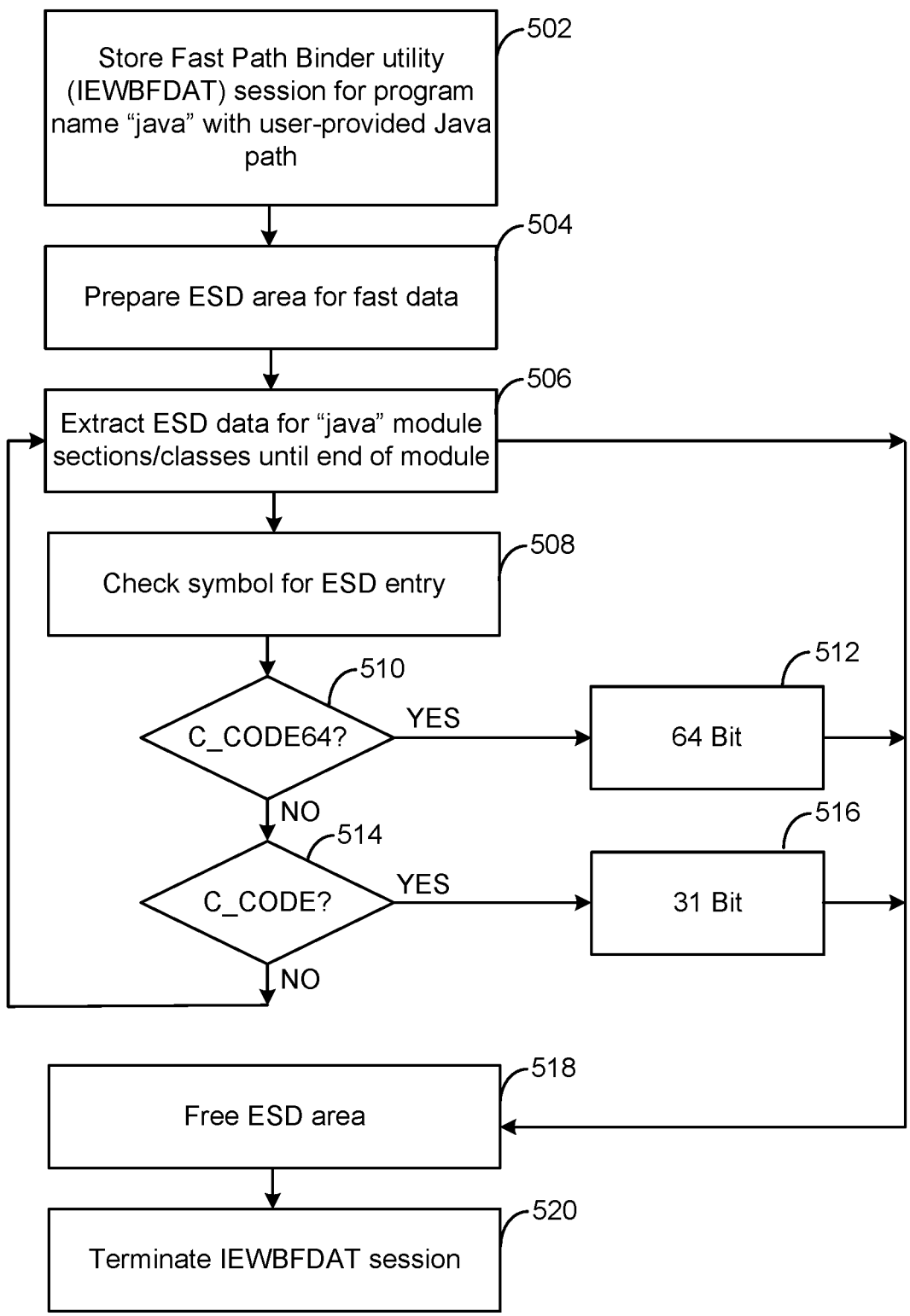
FIG. 5 is a flowchart illustrating a more detailed example of techniques for determining an address mode of a JVM used in the system of FIG. 1.

FIG. 5 is a flowchart illustrating a more detailed example of techniques for determining an address mode (AMODE) of a JVM used in the system of FIG. 1. For example, FIG. 5 provides a more detailed example of the operation 302 of FIG. 3.

In FIG. 5, a user-provided Java path may be used to store a fast path binder utility (IEWBFDAT) session for program name "java" (502). The fast path binder utility is one of a plurality of available utilities for binder inspection and changes. Other similar utilities may be used that provide an ability to interact with program objects, load modules, and other executables on the z/OS Unix system (e.g., 404 in FIG. 4) when called from the z/OS MVS system (e.g., 402 in FIG. 4). Such utilities are capable of making a call to the Unix side and dismantle qualified LE program objects (e.g., dismantle code sections or other elements). As JVM executables and/or directories are built similarly to MVS LE program objects and may be called from an MVS context using the referenced binder utilities, such techniques may also be able to extract JVM components from, e.g., the JVM executable 122 of FIG. 1.

In more detail, in example implementations, the program "java" (as a command name to execute a JVM and as a program object) may be accessed from the executable bin of the Java Development Kit (JDK) in the z/OS Unix context. For example, section definitions (SDs) of control section (CSECT) information may be extracted, and, as described above, the specific binder ESD may be extracted for storage.

To do so, an ESD area may be prepared for the extracted fast data (504). ESD records may include class names that include, or are stored together with, an AMODE flag. However, not all such artifacts may be reliably counted on to indicate an AMODE of the JVM executable 122. For example, program objects may be made up of a variety of components and may be a mixture of multiple address modes, such as 24-bit, 31-bit, or 64-bit.

In FIG. 5, a memory area for ESD data extracted as fast data may be prepared (504). Then, ESD data for the appropriate java module sections or classes may be extracted until the end of the java module is reached (506). ESD entries may then be checked for included symbols that indicate AMODE (508). That is, for example, by scanning ESD section records, it is possible to match class names with corresponding AMODE flags.

In the example of FIG. 5, if the ESD class C_CODE reflects a 64-bit AMODE flag (510), e.g., is named as C_CODE64, then the JVM being examined may be determined to be a 64-bit JVM (512). If not (510), and if the ESD class C_CODE reflects a 31-bit AMODE flag (514), e.g., is named as C_CODE, then the JVM being examined may be determined to be a 31-bit JVM (516).

If the AMODE is determined to be 64-bit (512) or 31-bit (516), or if the ESD data is fully extracted and scanned, then the process may end and the ESD area may be freed (518), and the IEWBFDAT session may be terminated (520).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer-implemented method, the method comprising:
   receiving, from a first application executing in a first runtime environment having a first address mode, at least one instruction;
   determining a function requested by an application executing in a first runtime environment, the function requiring execution by a second application running in a virtual machine in a second runtime environment;
   scanning a virtual machine executable of the virtual machine to identify at least one element of the virtual machine executable, including extracting java program data for the virtual machine executable of the virtual machine, using path data for the virtual machine executable, to determine the at least one element;
   inspecting the at least one element of the extracted java program data to identify an address mode (AMODE) flag;
   determining, from the at least one element and based on the AMODE flag, an AMODE of the virtual machine from among at least two AMODEs;
   launching the second runtime environment from the first runtime environment, using the AMODE;
   launching the virtual machine within the second runtime environment, using the AMODE, and including instantiating the virtual machine from the virtual machine executable;
   launching the second application within the virtual machine; and
   executing the function using the second application.

2. The method of claim 1, further comprising:
   returning a result of the executed function to the application.

3. The method of claim 1, wherein the first runtime environment is executed in a Multiple Virtual Storage (MVS) component of a z/OS operating system, and the second runtime environment is executed in a Unix component of the z/OS operating system.

4. The method of claim 1, wherein the first runtime environment is a 31-bit environment, and the at least two AMODES include a 31-bit AMODE and a 64-bit AMODE.

5. The method of claim 1, wherein the determined AMODE of the virtual machine is a 64-bit AMODE, and the second runtime environment is a 64-bit runtime environment.

6. The method of claim 1, wherein the first runtime environment and the second runtime environment are instances of a Language Environment (LE) runtime environment.

7. The method of claim 1, wherein the virtual machine includes a Java virtual machine (JVM).

8. A computer program product, the computer program product being tangibly embodied on a non-transitory computer-readable storage medium and comprising instructions that, when executed by at least one computing device, are configured to cause the at least one computing device to:
   determine a function requested by an application executing in a first runtime environment, the function requiring execution by a second application running in a virtual machine in a second runtime environment;
   scan a virtual machine executable of the virtual machine to identify at least one element of the virtual machine executable, including extracting java program data for the virtual machine executable of the virtual machine, using path data for the virtual machine executable, to determine the at least one element;
   inspect the at least one element of the extracted java program data to identify an address mode (AMODE) flag;
   determine, from the at least one element and based on the AMODE flag, an AMODE of the virtual machine from among at least two AMODEs;
   launch the second runtime environment from the first runtime environment, using the AMODE;
   launch the virtual machine within the second runtime environment, using the AMODE, and including instantiating the virtual machine from the virtual machine executable;
   launch the second application within the virtual machine; and
   execute the function using the second application.

9. The computer program product of claim 8, wherein the instructions are further configured to cause the at least one computing device to:
   return a result of the executed function to the application.

10. The computer program product of claim 8, wherein the first runtime environment is executed in a Multiple Virtual Storage (MVS) component of a z/OS operating system, and the second runtime environment is executed in a Unix component of the z/OS operating system.

11. The computer program product of claim 8, wherein the first runtime environment is a 31-bit environment, and the at least two AMODES include a 31-bit AMODE and a 64-bit AMODE.

12. The computer program product of claim 8, wherein the determined AMODE of the virtual machine is a 64-bit AMODE, and the second runtime environment is a 64-bit runtime environment.

13. The computer program product of claim 8, wherein the first runtime environment and the second runtime environment are instances of a Language Environment (LE) runtime environment.

14. The computer program product of claim 13, wherein the instructions are further configured to cause the at least one computing device to:

launch the second runtime environment using at least one LE pre-initialization (PIPI) service.

15. The computer program product of claim 8, wherein the virtual machine includes a Java virtual machine (JVM).

16. The computer program product of claim 15, wherein the instructions are further configured to cause the at least one computing device to:
pass a request for the function from the first runtime environment to the second runtime environment using a Java Native Interface (JNI).

17. A mainframe system comprising:
at least one memory including instructions; and
at least one processor that is operably coupled to the at least one memory and that is arranged and configured to execute instructions that, when executed, cause the at least one processor to:
determine a function requested by an application executing in a first runtime environment, the function requiring execution by a second application running in a virtual machine in a second runtime environment;
scan a virtual machine executable of the virtual machine to identify at least one element of the virtual machine executable, including extracting java program data for the virtual machine executable of the virtual machine, using path data for the virtual machine executable, to determine the at least one element;
inspect the at least one element of the extracted java program data to identify an address mode (AMODE) flag;
determine, from the at least one element and based on the AMODE flag, an AMODE of the virtual machine from among at least two AMODEs;
launch the second runtime environment from the first runtime environment, using the AMODE;
launch the virtual machine within the second runtime environment, using the AMODE, and including instantiating the virtual machine from the virtual machine executable;
launch the second application within the virtual machine; and
execute the function using the second application.

18. The system of claim 17, wherein the first runtime environment is a 31-bit environment, the determined AMODE of the virtual machine is a 64-bit AMODE, and the second runtime environment is a 64-bit runtime environment.

* * * * *